July 28, 1964
R. F. OSTER
3,142,399
FORK LIFT TRUCK WITH A SELF-CONTAINED
GRIPPING AND LATCHING ASSEMBLY
Filed Nov. 14, 1961
5 Sheets-Sheet 1
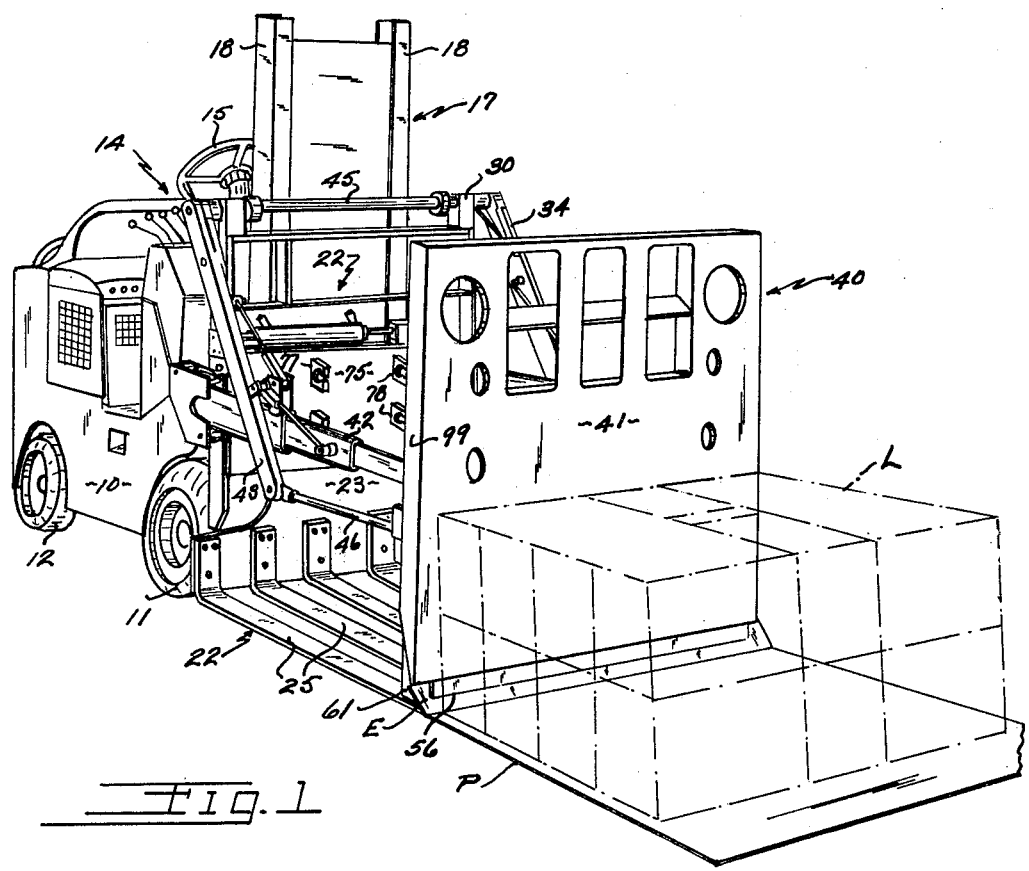
Fig. 1
Fig. 4
INVENTOR.
ROBERT F. OSTER
BY
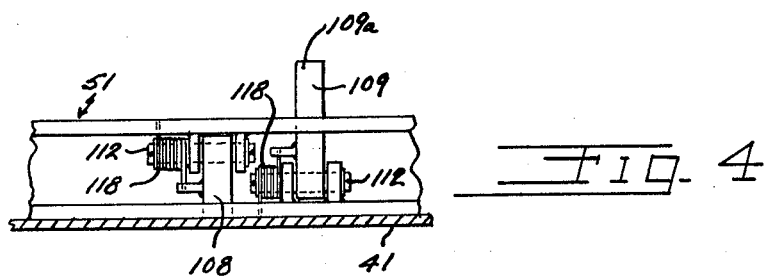
ATTORNEYS

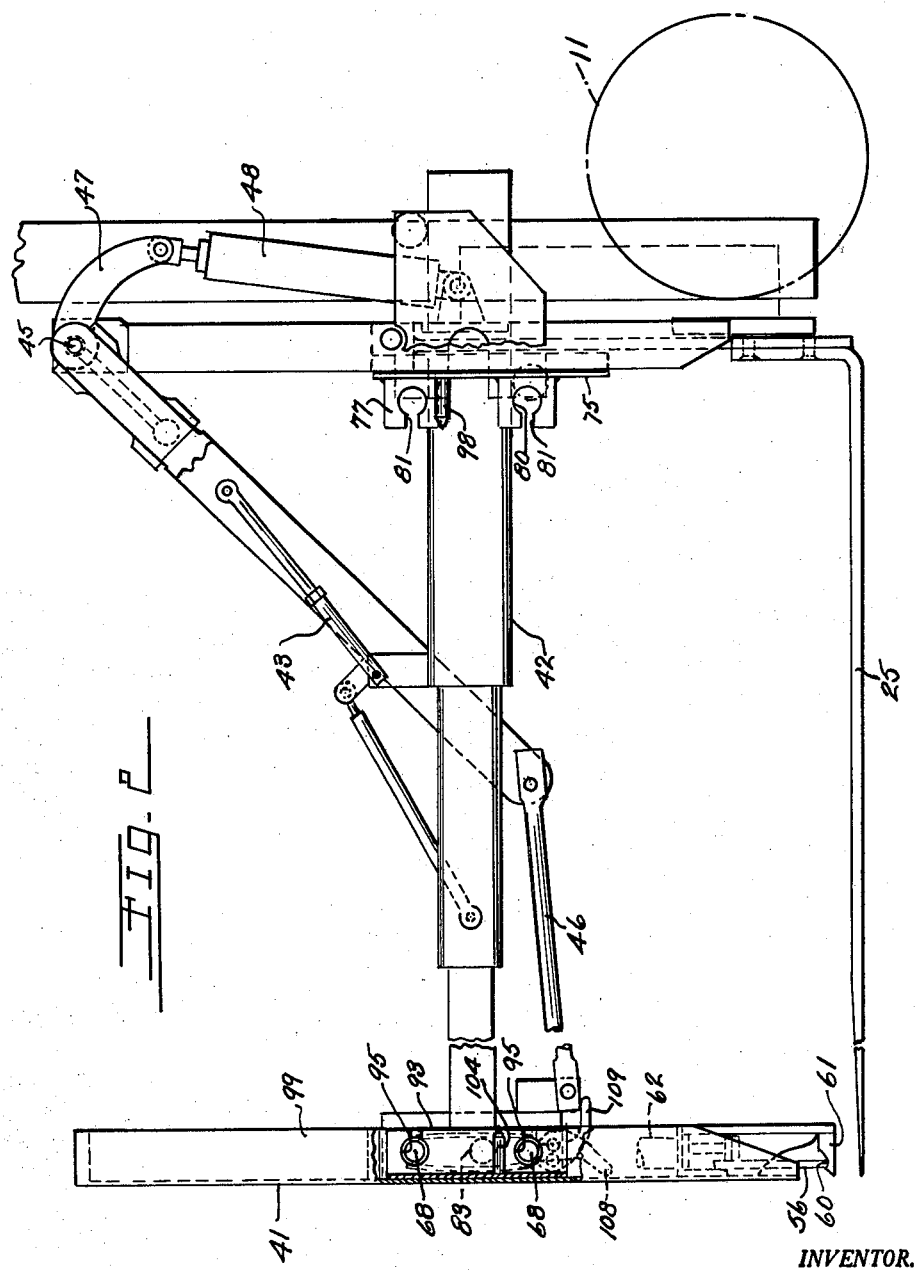

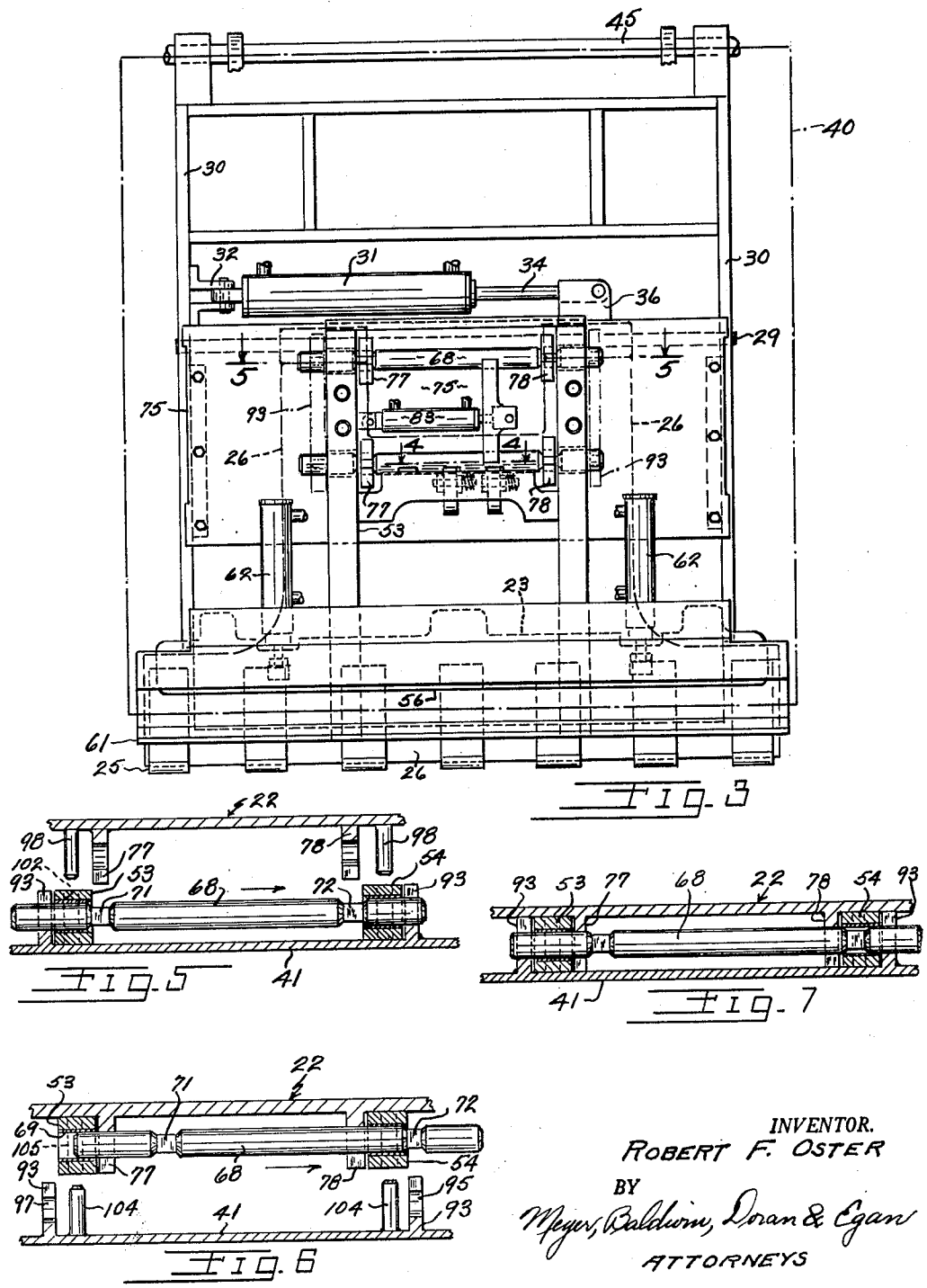

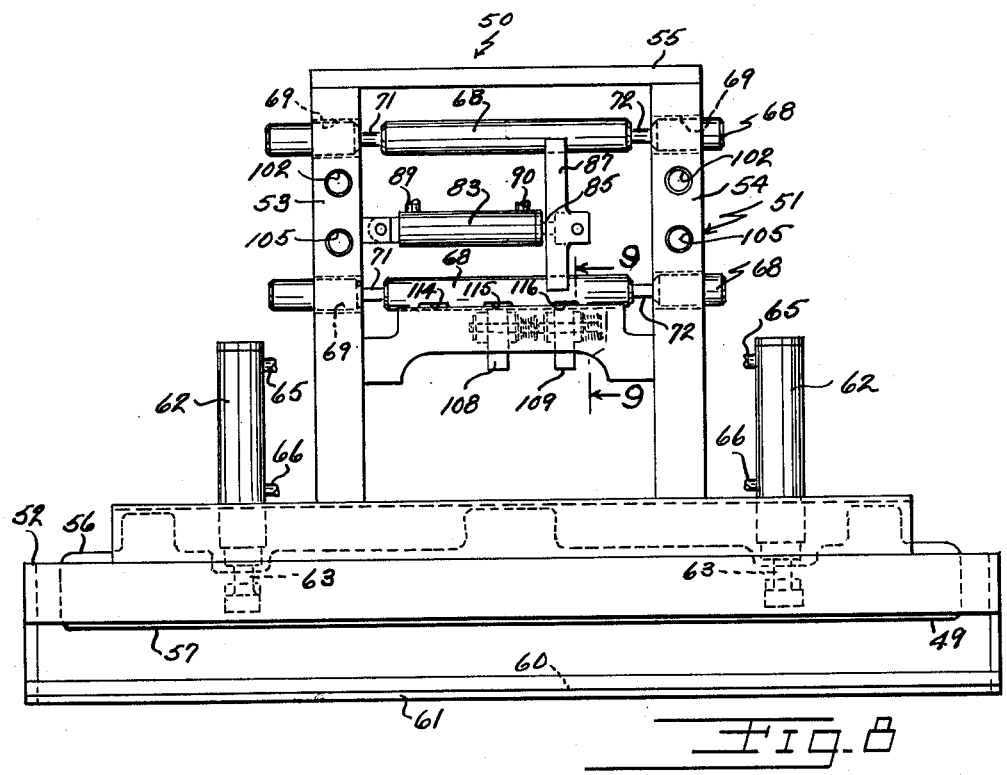
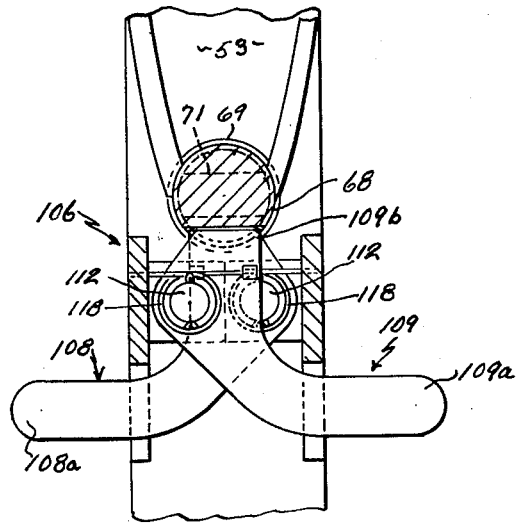

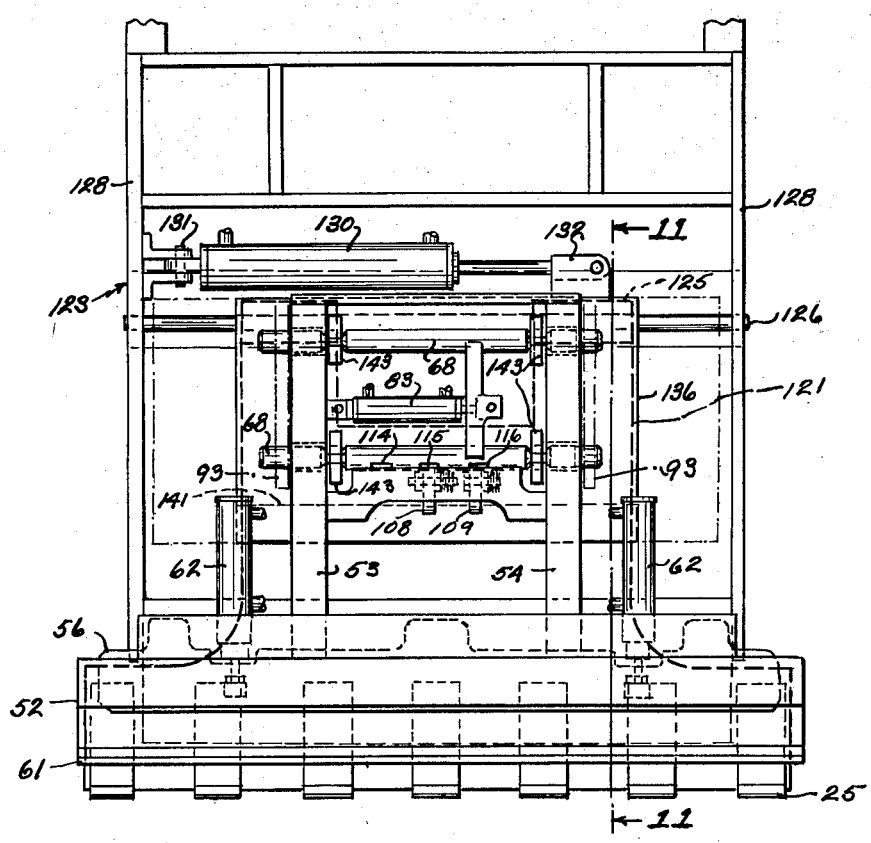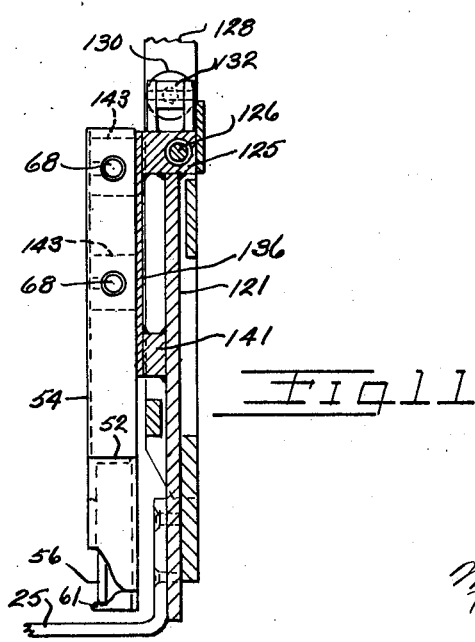

United States Patent Office 3,142,399
Patented July 28, 1964

3,142,399
FORK LIFT TRUCK WITH A SELF-CONTAINED GRIPPING AND LATCHING ASSEMBLY
Robert F. Oster, Rocky River, Ohio, assignor to Towmotor Corporation, Cleveland, Ohio, a corporation of Ohio
Filed Nov. 14, 1961, Ser. No. 152,296
7 Claims. (Cl. 214—514)

This invention relates generally to industrial trucks and more particularly to novel and improved pallet gripping means for use in an industrial truck assembly especially designed to provide for the conveyance of a palletized load or the like.

A primary object of the present invention is to provide novel and improved pallet gripping means for use in an industrial truck assembly especially designed for conveying palletized loads and wherein said gripping means is operable to grip a pallet supporting a load thereon and to effect its disposition onto the load supporting means of said truck assembly, said gripping means being thereafter movable with said load supporting means to a plurality of load dislodging stations and subsequently operable to retain said pallet on said supporting means while said load is dislodged therefrom at one of said stations.

Still another object of the present invention is to provide novel and improved pallet gripping means for use with an industrial truck assembly especially designed for conveying palletized loads, and which assembly includes load supporting means movable to a plurality of load disposal stations and load pusher means for ejecting a supported load therefrom, and wherein the gripping means is operable to grip a sheet type pallet supporting a load thereon and to effect its disposition onto said supporting means, being connectable with said supporting means and movable therewith while gripping said pallet to one of said load disposal stations and subsequently operable to retain said pallet on said supporting means as said pusher means dislodges said load at said station.

Another object of the present invention is to provide novel and improved gripping means for use with an industrial truck assembly especially designed for conveying palletized loads, and which assembly includes load supporting means movable transversely across said assembly to a plurality of load disposal stations, and pusher means for ejecting a supported load therefrom, and wherein the gripping means is connectable with said pusher means and movable therewith into position to grip a sheet type pallet supporting a load thereon and subsequently movable to effect its disposition onto said supporting means, said gripping means being thereafter connectable with said supporting means and movable therewith while gripping said pallet to one of said load disposal stations and thence operable to retain said pallet on said supporting means as said pusher means dislodges said load at said station.

Still another object of the present invention is to provide novel and improved gripping means for use with an industrial truck especially designed for conveying palletized loads as is above defined, and wherein said gripping means includes lock means selectively actuatable to connect said gripping means to said load supporting means and said pusher means.

Another object of the present invention is to provide a novel and improved industrial truck assembly especially designed for conveying palletized loads and which incorporates the use of gripping means effective to grip a load supporting pallet so as to enable said load to be moved onto the load supporting means for the truck assembly and to retain said pallet on the latter as said load is ejected from said supporting means.

Another object of the present invention is to provide a novel and improved industrial truck assembly especially designed for conveying palletized loads, and which incorporates the use of pallet gripping means effective to grip a sheet type load supporting pallet so as to enable said load to be moved onto the load supporting means for the truck assembly and to retain said pallet on the latter as said load is ejected from said supporting means, and wherein said pallet gripping means includes lock bolt means actuatable into selective locking engagement with keeper means carried on the load supporting means and the load ejecting means for the said assembly to thereby latch said gripping means selectively to the latter and said load supporting means.

Additional objects and advantages of the gripping means of the present invention will be apparent to one skilled in the art to which it pertains upon reference to the following disclosure of several preferred embodiments thereof and which are illustrated in the accompanying drawings forming a part of this specification, wherein:

FIG. 1 is a side perspective view of an industrial truck assembly embodying the pallet gripping means of the present invention;

FIG. 2 is a fragmentary side elevational view with the truck assembly shown partially in diagrammatic form, and with the pallet gripping means latched to the load pusher means of the said truck assembly;

FIG. 3 is a fragmentary front elevational view showing the pallet gripping means latched to the load pusher means and with the front plate of the load pusher means shown in phantom to more clearly illustrate the underlying structure of said pusher means;

FIG. 4 is a fragmentary sectional view taken approximately on the plane as is indicated by the line 4—4 in FIG. 3;

FIG. 5 is a fragmentary sectional view taken approximately on the plane as is indicated by the line 5—5 in FIG. 3;

FIG. 6 is a view similar to FIG. 5 but showing the pallet gripping means latched to the truck carriage mounting the load supporting means;

FIG. 7 is a sectional view similar to FIGS. 5 and 6 and showing the locking means of the pallet gripping means in the intermediate position that is taken thereby as it is moving from either its carriage or pusher means latching position;

FIG. 8 is a front elevational view of the pallet gripping means removed from the truck assembly to more clearly show its construction;

FIG. 9 is a fragmentary vertical sectional view taken approximately on the plane as indicated by the line 9—9 in FIG. 8;

FIG. 10 is a front elevational view of a second embodiment of industrial truck assembly utilizing a pallet gripping means of the present invention; and FIG. 11 is a vertical sectional view taken approximately on the plane as is indicated by the line 11—11 in FIG. 10.

Briefly, the pallet gripping means of the present invention is herein shown as especially designed for use with an industrial truck assembly that is intended to transport palletized loads and the like through a warehouse or similar industrial installation, and wherein, it is intended to pick up a load supported on a pallet, transport said load to a selected station wherein the same is thence dislodged from said truck while the pallet gripping means is operable to retain the pallet and thus separate it from said deposited load.

In a preferred embodiment of truck assembly as seen in FIG. 1, the pallet gripping means is intended to be selectively latched to either the load supporting carriage so as to be movable therewith in a generally vertical plane or to the load pusher or ejector means so as to likewise be movable therewith in a generally horizontal plane.

In the alternate embodiment of truck assembly, the pallet gripping means is preferably designed so as to be capable of being latched to the load supporting means which is, in turn, movable in either a generally vertical or horizontal transverse plane or to the load pusher means being movable with the latter as in the aforesaid preferred embodiment.

With reference now directed particularly to FIG. 1, the embodiment of industrial truck herein disclosed is seen to include a vehicular body indicated in its entirety by the reference numeral 10, and which, in its instant construction, is preferably of the motorized type as referred to in the art thus capable of self propulsion. Said truck is seen to be supported on front and rear wheels 11 and 12, and to be provided with an operator's station 14 at which steering gear 15 and suitable controls are located by which an operator may provide for the manipulation of said truck assembly as will be understood.

The truck is also seen to have a mast assembly indicated in its entirety by the reference numeral 17, and which comprises a spaced pair of mast rails 18 mounted in a generally vertical plane on the front end of the vehicular body 10, said mast assembly, although not herein shown, being preferably reversibly tiltable so as to locate the same at a predetermined vertical angle relative to said forward end of the truck assembly.

A carriage 22 including plate 23 is mounted on said mast assembly 17 so as to be vertically movable therealong by any conventional mechanism, said carriage also mounting a plurality of load supporting fork members 25 which extend forwardly from the body of said truck assembly being thus supported so as to be movable with said carriage.

The plate 23 is provided with a pair of spaced arms 26 which extend substantially vertically upwardly therefrom as best seen in FIG. 3, and which, in turn, are journaled on a bar 29 supported in a horizontal plane by and between the upright side rails 30 of the carriage 22.

A conventional double acting fluid cylinder 31 is seen to be anchored at 32 to one of the aforesaid carriage rails 30 and to have its piston rod 34 attached to a socket 36 carried on one of the upright arms 26. The fluid cylinder 31 is connected in a suitable fluid control circuit (not shown) and which is intended to be actuated by controls at the operator's station 14 so as to slidably propel the plate 23 and fork members 25 across the front of the truck assembly being thus effective to "side shift" a load supported on the latter.

With this construction it will now be apparent that the carriage 22 may be moved within the supporting mast assembly 17 so as to locate a load carried on the fork members 25 to a selected raised position and the plate 23 may then be slidably moved along the supporting bar 29 to carry the load transversely of the truck assembly to a preselected load disposal station.

The instant truck assembly is also provided with load pusher means indicated generally at 40 and which includes a pusher plate 41 disposed in a vertical plane, being movably supported in said position by means of telescopically arranged extendable rail members 42 as best seen in FIGS. 1 and 2, and which is supported by said members so as to be reciprocated over the fork members 25 and thus effective to dislodge a load from the latter.

Suitable linkage as indicated at 43 located on each side of the carriage 22 and movable with the same is seen to be mounted at the upper end to opposite ends of a shaft 45 so as to be rotatable therewith, each of said linkages being connected through a tie rod 46 to the pusher plate 41. A crank arm 47, attached to each end of the shaft 45 so as to be rotatable therewith, is connected to a conventional hydraulic cylinder 48 mounted on the assembly carriage, the latter being actuatable to rotate said shaft 45 and thereby swing said linkage and provide for the reciprocation of the pusher plate 41 to and fro of the underlying load supporting forks 25.

As is aforementioned, the pallet gripping means of the present invention is especially designed for use with the instant truck assembly to grip a sheet type of load supporting pallet, being effective to enable said load and pallet to be pulled onto the load supporting forks 25, and thereafter operable to retain said pallet on the latter while the load is subsequently ejected therefrom by the load pusher assembly 40.

In its present form as best seen in FIGS. 3 and 8, the pallet gripping means is herein identified in its entirety by the reference numeral 50, and is seen to include a framework 51 being somewhat of inverted T-shaped configuration and including a boxlike base 52 and a pair of upright rib members 53 and 54 attached to said base in predetermined longitudinal spaced relation, extending substantially vertically upwardly therefrom and mounting a plate 55 on the upper ends thereof to afford additional rigidity to said assembly.

A knifelike pallet gripper blade 56 is supported so as to be reciprocably vertically movable within the base 52 of the pallet framework whereby its bottom longitudinal edge 57 is brought into clamping association with a notch 60 formed in clamping bar 61 rigidly attached to the underside of said base and extending longitudinally along the same, said blade being thus effective to grip an edge of a load supporting pallet placed between said blade and clamping bar to thereby releasably anchor said pallet to said gripping means.

Hydraulic cylinders 62 mounted on the base 52 are each seen to have their piston rods 63 attached to said gripper blade 56, said cylinders, in turn, being connected by conduits 65 and 66 into a suitable fluid circuit and controlled by means of the aforementioned controls at the operator's station 14 to vertically reciprocate said blade within said framework base.

As previously indicated, the pallet gripping means 50 is provided with locking means which are selectively actuatable so as to latch the same to either the load pusher 40 or to the carriage weldment 22 supporting the fork members 25.

In the present embodiment of pallet gripping means, the locking means is herein disclosed to include a pair of bolt members 68 mounted within spaced apertures 69 formed in each of the upright rib members 53 and 54 so as to be slidable therein, said bolt members being thus disposed so as to be in substantial parallel spaced relation each to the other and to the pallet framework base 52.

Each of the bolt members 68 is seen to be substantially cylindrical in form and having a pair of neck portions 71 and 72 of reduced diameter spaced longitudinally therealong.

A conventional double acting fluid motor is seen to have its cylinder 83 attached to the rib member 53 and its piston 85 anchored to a connector bar 87 projecting between and rigidly attached at its opposed ends to the bolt members 68 preferably intermediate the neck portions thereof. The fluid motor is preferably connected by conduits 89 and 90 into the aforementioned fluid control circuit and is actuatable by controls at the operator's position 14, being thus effective to reversibly slidably move the bolt members 68 through the rib members 53 and 54.

As best seen in FIG. 2, the carriage 22 includes a rectangular plate 75 mounted on the side rails 30, and which has spaced pairs of upper and lower keeper members 77 and 78 respectively rigidly attached to its front face so as to project forwardly therefrom and toward the load pusher assembly 40. Each of said keeper members is provided with a keyhole-shaped slot or keyway 80 which opens toward said load pusher assembly, the throat portion 81 of each keyway being slightly larger in its dimension than the reduced neck portions 71, 72 of the bolt members 68, whereas the enlarged portion of each keyway is slightly larger in diameter than the diameter of said bolt members.

This construction, as will later appear, is intended to enable the bolt members to be readily disposed within said keyways 80 and to be freely slidably movable therein.

As is best seen in FIG. 3, the keeper members 77 and 78 are also spaced vertically apart on the plate 75 a distance corresponding to the distance between the bolt members 68, and preferably sufficiently upwardly from the carriage plate 23 so that when the pallet gripping means is latched to the carriage, as will later appear, the clamping bar 61 will be located slightly above the load forks 25.

As will likewise be seen in FIG. 3, the keeper members of each pair are spaced horizontally apart a distance corresponding to the spacing between the reduced neck portions 71, 72 on the bolt members 68.

The upper keeper members 77 are also seen to be vertically aligned with the lower keeper members 78, said arrangement being operable with the bolt members 68, as will be later apparent, to define a latch assembly of parallelogram configuration effective to releasably latch the pallet gripping means to the carriage weldment 22.

A pair of latch plates 93 is also rigidly attached in an endwise vertical position to the rear face of the pusher plate 41 of the load pusher means, said latch plates being disposed in parallel spaced relation to each other, and likewise preferably spaced apart a distance that is somewhat greater than the spacing between the keeper members 77 and 78 and also a distance that is slightly less than the length of the bolt members 68.

The latch plate 93 adjacent the right side edge of the pusher plate 41, as seen in FIGS. 2 and 6, is provided with a vertically spaced pair of keyways 95, each of which is similar to the keyways 80 in the keeper members 77 and 78, said keyways 95 opening or facing toward the carriage weldment 22 and located in said latch plate 93 so as to be alignable with the aforesaid bolt members 68.

The oppositely disposed latch plate 93 is also seen to be formed with a vertically spaced pair of apertures 97, each of which is slightly larger in diameter than the diameter of the bolt members 68, said apertures being likewise disposed so as to be alignable with the latter.

As will likewise be more apparent hereinafter, this assembly is also operable with the bolt members 68 to define a latch assembly of parallelogram configuration effective to releasably latch the pallet gripping means to the load pusher assembly.

In its initial installation and attachment to the carriage weldment 22 of the truck assembly, the framework 51 of the pallet gripping means is disposed in an upright position such as seen in FIGS. 3 and 8 and located forwardly of the mast assembly 17 so as to align the bolt members 68 with the keyways 80 in the keeper members 71, 72.

The bolt members 68 are then slidably adjusted in the retaining rib members 53 and 54 so as to locate the neck portions thereof directly in front of the open throats of said keyways, such as to the position therefor as is illustrated in FIG. 5.

Thereafter, the framework 51 is placed up against the carriage plate so as to permit the aforementioned neck portions of said bolt members to be carried into said keyways.

Suitable aligning pins 98 mounted on the front face of the carriage plate and projecting forwardly therefrom are adapted to be insertable into accommodating apertures 102 formed in the rib members of the gripper framework 51 to thereby assist in properly aligning the bolt members 68 with said keeper members. Said bolt members are then actuated or moved to a "latching" position as is shown in FIG. 6 effective to dispose said neck portions to one side of said keyways and thereby locate an enlarged part of each bolt member within the confines of each of said keyways hence resulting in latching the pallet gripping means to the carriage weldment 22 of the truck assembly.

With this arrangement as is aforementioned, the pallet gripping means may then be movable with the carriage along the mast assembly 17.

To subsequently latch the pallet gripping means to the load pusher assembly, said assembly is retracted over the load supporting fork members 25 toward the mast assembly 17.

With the bolt members 68 in their "carriage latching" position as shown in FIG. 6, it is noted that the neck portion adjacent the right end of each member is aligned with one of the keyways 95 formed in the latch plate 93 mounted on the rear face of the pusher plate adjacent its right vertical edge. It is also noted that the left end of each bolt member is confined within its supporting left rib member.

With said bolt members thus located, the load pusher assembly is fully retracted so as to bring the latch plates 93 alongside the outer vertical side face of the rib members of the gripper framework 51 whereby the aligned neck portions of said bolt members are disposed in the aforesaid keyways 95.

Suitable alignment pins 104 mounted on the rear face of the pusher plate 41 and projecting rearwardly therefrom are adapted to be insertable into accommodating apertures 105 formed in the aforesaid rib members so as to assist in properly aligning said gripper framework with said load pusher plate.

The bolt members 68 are then moved to a "load pusher latching" position as shown in FIG. 5 whereby the left end portions of said bolt member extend into the apertures 97 provided in the left side latch plate 93 and an enlarged part of each of said bolt members is located with each of said keyways 95 in the right side latch plate 93.

In this manner, the pallet gripping means is latched to the load pusher assembly and hence capable of being movable with the same over the load supporting fork members 25.

As best seen in FIGS. 2 and 3, the pallet gripping means is preferably of such assembled construction so as to be confined in a nested relation within the area defined by the load pusher plate and its attached side panels 99 to thereby provide a substantially compact assembly which does not add to the overall size of the truck assembly.

FIG. 5 of the drawings shows the position to which the bolt members 68 are actuated to latch the pallet gripping means to the load pusher assembly and to likewise illustrate that as said assembly moves forwardly of the carriage 22 said gripping means is completely released from said carriage.

FIG. 6 in a similar manner, illustrates the position to which the bolt members 68 are actuated to latch the pallet gripping means to the carriage 22 and to also show that when the load pusher assembly is thereafter moved forwardly of said carriage, said gripping means is completely released from said assembly.

To prevent the bolt members 68 from being inadvertently moved to an unlatched position, for example, as a result of a failure in the fluid control circuit for the fluid motor 83 therefor or as a result of the truck being used over somewhat irregular or rough terrain, the instant pallet gripping assembly is also provided with lock means as best seen in FIGS. 2, 4 and 9 which is operable to releasably lock said bolt members in either of the "latched" positions therefor as just described.

With reference directed particularly to FIG. 9, the instant embodiment of lock means identified herein in its entirety by the reference numeral 106, comprises a pair of spring biased locking levers 108, 109, each of which is rotatably journaled on a shaft 112 mounted on the gripper framework 51 below the lower bolt member.

Each locking lever is identical in construction being somewhat L-shaped in configuration and having a tail part 108a, 109a and a locking tab 108b which is hidden in FIG. 9, 109b formed in its opposite end.

The lower bolt member 68 is provided on its underside with a series of three grooves 114, 115, 116 which are disposed in spaced relation to each other longitudinally therealong.

Each lever is journaled on its supporting shaft 112 and urged by a coil spring 118 to normally position its locking tab 108b, 109b, into pressure engagement with the bolt member located thereabove.

In the instant locking assembly, the lever 108 is urged to rotate in a counterclockwise direction whereas its companion lever 109 is urged to rotate in a clockwise direction. In this position, the tail part 108a, 109a of said locking levers extend forwardly and rearwardly respectively from the gripper framework 51, the purpose for which will now be explained.

With the pallet gripping means latched to the load pusher assembly in the manner above described, the pusher plate 41 engages the forwardly projecting tail part 108a of the locking lever 108 and rotates the same in a counterclockwise direction thereby removing its locking tab from engagement with the bolt member 68.

With said bolt members in their "load pusher latching" position as is seen in FIG. 3, the locking tab 109b of the lever 109 is urged into the groove 116 on said lower bolt member thereby locking said members in said actuated or latched position.

In like manner, with the pallet gripping means latched to the carriage weldment 22, the carriage plate 75 engages the tail part 109a of the locking lever 109 and rotates the same to thereby remove its locking tab from engagement with the lower bolt member.

Said bolt members 68, as will be recalled, are moved to the position therefor as is seen in FIG. 6 to latch the gripping means to said carriage.

In this position, the groove 114 is located directly above the locking lever 108 to thereby accommodate its locking tab 108b to thus lock said bolt members in said latched position.

Preparatory to latching the pallet gripping means to either the load supporting means or the pusher assembly after the initial installation of said gripping means the load pusher means is first fully retracted to the position therefore as is shown in FIG. 7. In this position each of the locking levers 108 and 109 is swung to its "unlocked" position relative to the bolt members 68 thus permitting the latter to be subsequently actuated to either of their "latched" positions.

In operation with the industrial truck assembly disclosed herein, the instant pallet gripping means is operable as aforementioned, to grip one edge of a sheetlike pallet supporting a load thereon, pull the palletized load onto the fork members 25 and to thereafter retain said pallet thereon as the load is dislodged from said fork members and deposited at a load disposal station.

To accomplish this, the pallet gripping means is latched to the load pusher assembly in the manner previously described, the fluid motor being utilized by the operator at his control station 14 to power actuate the bolt members 68 to their "load pusher latching" position.

Thereafter, the load pusher plate 41 is extended forwardly of the mast assembly 17 so as to locate the leading edge E of a pallet P as seen in FIG. 1 supporting a load L thereon onto the clamping bar 61 so as to overlie the notch 60.

The operator then actuates the cylinders 62 to lower the gripper blade 56 into clamping engagement with said pallet edge E.

The load pusher plate 41 is then retracted over the fork members 25 effective to pull the palletized load L onto the latter.

With the load thus supported, the gripper blade 56 may then be raised to release the pallet, and the carriage 22 may then be raised and/or the fork carriage plate 23 moved transversely across the mast assembly 17 to a load ejecting position.

The pallet gripping means is then latched to the carriage plate 75 and the gripper blade 56 is again lowered to clamp the pallet edge E.

The load pusher plate 41 is then projected forwardly along the load supporting forks 25 pushing the load L off the pallet P retained on said forks and to its disposal station. The gripper blade 56 is then again raised so that the pallet P may be removed from the fork members 25 and subsequently used.

In FIGS. 10 and 11 the pallet gripping means is herein shown as especially designed to be selectively attached to the load pusher assembly as in the previous embodiment, or to a laterally actuatable fork carriage plate 121 of the carriage 22 supporting the load fork members 25 so as to be movable laterally across the mast assembly 17 with said carriage plate 121 whereby the pallet gripper blade need not be raised out of clamping engagement with the pallet edge E prior to said lateral transfer of the load L carried thereon.

The assembly of the pallet gripping means and of the truck now under consideration are substantially similar to the previously disclosed embodiment, consequently the same reference numerals are herein used to identify like parts.

As seen in FIG. 10, the vertical carriage fork plate 121 of the carriage assembly 123 mounts the fork members 25 on its lower end and is attached at its upper end to a pair of block members 125 slidably journaled on a shaft 126, the latter extending across the mast assembly 17 and anchored at its ends to a pair of side rails 128 forming a part of said carriage assembly 123.

A double acting fluid motor 130 anchored at 131 to one of said side rails 128 and having its piston rod connected by connector 132 to one of said block members 125, may be actuatable to reciprocally move the carriage fork plate 121 laterally across the mast assembly in the same manner as in the previous embodiment so as to "side shift" a load supported on the fork member.

A latch plate 136 is suspended in front of the carriage fork plate 121 in generally a vertical plane, being rigidly secured to the aforesaid block members 125 and to a spacer bar 141 carried on the front face of said carriage fork plate.

Keeper members 143 are mounted on the front face of the latch plate 136, being disposed thereon in the same manner as the keeper members 77, 78 in the previous embodiment and operable in the identical manner as the latter with respect to the latch bolt members 68, to thereby latch the pallet gripping assembly to the latch plate 136 and hence to the carriage fork plate 121.

With this construction it will now be realized that with the palletized load moved onto the fork members 25 and the leading edge of the pallet P clamped to the pallet gripping assembly, the load may be side shifted laterally by the mast assembly 17 without the necessity of first releasing the pallet P.

Having thus described several preferred embodiments of pallet gripping means of the present invention, it will be realized by one skilled in the art to which it pertains that various modifications, changes and arrangements of parts may be made without departing from the inventive concepts thereof as are defined in the claims.

What is claimed is:

1. In an industrial truck having a supporting chassis and embodying load supporting means actuatable to a plurality of load dislodging positions and load pusher means extendable in a first direction over said supporting means to dislodge a load therefrom; pallet gripping means for gripping a load supporting pallet including a framework extending transversely across the front of said truck being free of said supporting chassis, a blade movably carried in said frame work, a clamping bar attached to said framework and positioned to be operable with said blade to grip a pallet therebetween, means for singularly latching said framework to said load supporting means and said pusher means including bolt means slidably carried in said framework, keeper means carried on said load supporting means and said load pusher means and positioned for latching engagement with said bolt means, said pallet gripping means being extendable in said first direction over said load supporting means with said pusher means, said blade being thereafter actuatable with said clamping bar to grip a load supporting pallet therebetween, said pusher means being retractable in a second direction over said load supporting means whereby said pallet gripping means pulls said pallet and load onto said supporting means, said pallet gripping means being subsequently latched to said load supporting means and operable to retain said pallet thereon as said pusher means is again extended in said first direction to dislodge said load from said pallet.

2. In an industrial truck having a supporting chassis and embodying load supporting means actuatable to a plurality of load dislodging positions and load pusher means extendable in a first direction over said supporting means to dislodge a load therefrom; pallet gripping means for gripping a load supporting pallet including a framework extending transversely across the front of said truck being free of said supporting chassis, a blade movably carried in said framework, a clamping bar attached to said framework and positioned to be operable with said blade to grip a pallet therebetween, means for singularly latching said framework to said load supporting means and said pusher means including a pair of bolt members slidably disposed in said framework, a plurality of keeper members carried on said load supporting means and said load pusher means and positioned for latching engagement with said bolt members to thus define a multiple contact latch, said pallet gripping means being extendable in said first direction over said load supporting means with said pusher means, said blade being thereafter actuatable with said clamping bar to grip a load supporting pallet therebetween, said pusher means being retractable in a second direction over said load supporting means whereby said pallet gripping means pulls said pallet and load onto said supporting means, said pallet gripping means being subsequently latched to said load supporting means and operable to retain said pallet thereon as said pusher means is again extended in said first direction to dislodge said load from said pallet.

3. In an industrial truck having a supporting chassis and embodying load supporting means actuatable to a plurality of load dislodging positions and load pusher means extendable in a first direction over said supporting means to dislodge a load therefrom; pallet gripping means for gripping a load supporting pallet including a framework extending transversely across the front of said truck, being free of said supporting chassis, a blade movably carried in said framework, a clamping bar attached to said framework and positioned to be operable with said blade to grip a pallet therebetween, means for singularly latching said pallet gripping means successively to said load supporting means and said pusher means including a pair of bolt members slidably mounted in spaced relation to each other in said framework, spaced pairs of keeper members mounted on said load supporting means and said pusher means, said keeper members being formed with latching keyways, said pallet gripping means being positioned to locate said bolt members within the keyways of the keeper members on said pusher means, actuating means for sliding said bolt members into latching engagement with said keeper members on said pusher means and said pallet gripping means being thereafter movable with the latter in said first direction over said load supporting means to locate the leading edge of a load supporting pallet on said clamping bar, said blade being actuatable to clamp said pallet edge to said bar, said pallet gripping means being thereafter retractable with said pusher means to pull said pallet and load onto said supporting means, said gripping means being positioned by said pusher means in said retracted position to locate said bolt members within the keyways of the keeper members on said supporting means, said actuating means sliding said bolt members into latching engagement with said last named keeper members, and said pallet gripping means retaining said pallet on said supporting means as said pusher means is subsequently movable in said first direction to dislodge said load therefrom.

4. Pallet gripping means for use with an industrial truck as is defined in claim 3 and wherein alignment means on said framework and load supporting means are operable to locate the bolt members within the keyways of the keeper members on said supporting means.

5. Pallet gripping means for use with an industrial truck as is defined in claim 3 and wherein alignment means on said framework and load pusher means are operable to locate the bolt members within the keyways of the keeper members on said pusher means.

6. In an industrial truck having a supporting chassis and embodying load supporting means actuatable to a plurality of load dislodging positions and load pusher means extendable in a first direction over said supporting means to dislodge a load therefrom; pallet gripping means for gripping a load supporting pallet including a framework extending transversely across the front of said truck being free of said supporting chassis, a blade movably carried in said framework, a clamping bar attached to said framework and positioned to be operable with said blade to grip a pallet therebetween, means for singularly latching said pallet gripping means successively to said load supporting means and said pusher means including a pair of bolt members slidably mounted in spaced relation to each other in said framework, spaced pairs of keeper members mounted on said load supporting means and said pusher means, said keeper members being formed with latching keyways, alignment means for locating said bolt members within the keyways of the keeper members on said pusher means, actuating means for sliding said bolt members into latching engagement with said keeper members on said pusher means effective to define a latching assembly of parallelogram configuration, lock means interconnecting said pallet gripping means and said bolt members for locking said bolt members in said latching position, said pallet gripping means being thereafter movable with the latter in said first direction over said load supporting means to locate the leading edge of a load supporting pallet on said clamping bar, said blade being actuatable to clamp said pallet edge to said bar, said pallet gripping means being thereafter retractable with said pusher means to pull said pallet and load onto said supporting means, alignment means operable to position said pusher means in said retracted position so as to locate said bolt members within the keyways of the keeper members on said supporting means, said actuating means sliding said bolt members into latching engagement with said last named keeper members effective to define a latching assembly of identical configuration, said lock means being operable to lock said bolt members in said latching position with said load supporting means, and said pallet gripping means retaining said pallet on said supporting means as said pusher means is subsequently movable in said first direction to dislodge said load therefrom.

7. In an industrial truck having a supporting chassis and embodying load supporting means actuatable transversely of said truck to a plurality of load dislodging positions and load pusher means extendable in a first direction over said supporting means to dislodge a load therefrom; pallet gripping means for gripping a load supporting pallet including a framework extending transversely across the front of said truck being free of said supporting chassis, a blade movably carried in said framework, a clamping bar attached to said framework and positioned to be operable with said blade to grip a pallet therebetween, means for singularly latching said pallet gripping means successively to said load supporting means and said pusher means including a pair of bolt members slidably mounted in spaced relation to each other in said framework, spaced pairs of keeper members mounted on said load supporting means and said pusher means, said keeper members being formed with latching keyways, said pallet gripping means being positioned to locate said bolt members within the keyways of the keeper members on said pusher means, actuating means for sliding said bolt members into latching engagement with said keeper members on said pusher means and said pallet gripping means being thereafter movable with the latter in said first direction over said load supporting means to locate the leading edge of a load supporting pallet on said clamping bar, said blade being actuatable to clamp said pallet edge to said bar, said pallet gripping means being thereafter retractable with said pusher means to pull said pallet and load onto said supporting means, said gripping means being positioned by said pusher means in said retracted position to locate said bolt members within the keyways of the keeper members on said supporting means, said actuating means sliding said bolt members into latching engagement with said last named keeper members, said pallet gripping means retaining said pallet on said supporting means as the latter is moved transversely of said truck to one of said load dislodging positions and said pusher means being subsequently movable in said first direction to dislodge said load from said supporting means.

References Cited in the file of this patent

UNITED STATES PATENTS

| | | |
|---|---|---|
| 2,950,831 | Anzons | Aug. 30, 1960 |
| 2,955,721 | Hepler et al. | Oct. 11, 1960 |
| 2,996,204 | Jensen | Aug. 15, 1961 |